United States Patent [19]

Corleto et al.

[11] Patent Number: 5,319,573

[45] Date of Patent: Jun. 7, 1994

[54] METHOD AND APPARATUS FOR NOISE BURST DETECTION IN A SIGNAL PROCESSOR

[75] Inventors: Jose G. Corleto; Luis A. Bonet; David Yatim, all of Austin, Tex.

[73] Assignee: Motorola, Inc., Schaumburg, Ill.

[21] Appl. No.: 821,111

[22] Filed: Jan. 15, 1992

[51] Int. Cl.$^5$ .................. G06K 9/40; H04B 14/06; H04B 15/00

[52] U.S. Cl. ............................. 364/514; 375/27; 375/34; 375/99; 375/76; 341/143

[58] Field of Search ............... 379/63, 61, 59; 375/10, 375/34, 99, 27, 76, 104; 364/514; 341/143

[56] References Cited

U.S. PATENT DOCUMENTS 5,259,001  11/1993  Carleto et al. .................. 575/27

OTHER PUBLICATIONS

Nelson et al.; Title: "Digital methods for the detection of incipient fault conditions in spaceborne power systems"; 25th Intersociety Energy Conversion Engineering Conference 25th:1990; Nov.

Analysis Transmission and Filtering of Signals by Mansour Javid et al. (Textbook) pp. 109–105, 1981.

Primary Examiner—Jack B. Harvey
Assistant Examiner—Kamini S. Shah
Attorney, Agent, or Firm—Paul J. Polansky

[57] ABSTRACT

A signal processor such as an ADPCM decoder (28b) receives an input signal. As part of the CCITT Recommendation G.726 algorithm, ADPCM decoder (28b) processes the input signal to provide a linear reconstructed signal $s_r(k)$. When enabled, a noise detector (50) samples the reconstructed signal $s_r(k)$ once for each of a predetermined number of received samples. The noise detector (50) adds the absolute value of the reconstructed signal $s_r(k)$ to a total energy estimate. At the end of the predetermined number of samples, the noise detector (50) compares the total energy estimate to a product of a noise threshold and the predetermined number. If the total energy estimate exceeds this product, then a noise indication is provided. This calculation prevents the need for time-consuming division operation which is difficult for high-performance digital signal processors (70).

16 Claims, 5 Drawing Sheets

FIG. 2 —PRIOR ART—

METHOD AND APPARATUS FOR NOISE BURST DETECTION IN A SIGNAL PROCESSOR

CROSS REFERENCE TO RELATED, COPENDING APPLICATIONS

Related, copending applications are application Ser. No. 07/882,033, filed concurrently herewith, by Gary S. Lobel, and assigned to the assignee hereof, entitled "Method and Apparatus for Broken Link Detect Using Audio Energy Level"; and application Ser. No. 810,775, filed Dec. 17, 1991, now U.S. Pat. No. 5,259,001, issued Nov. 2, 1993, by Jose Corleto, Luis Bonet, and David Yatim, and assigned to the assignee hereof, entitled "ADPCM Decoder with an Integral Digital Receive Gain and Method Therefor".

FIELD OF THE INVENTION

This invention relates generally to signal processors, and more particularly, to signal processors with noise burst detection and related methods.

BACKGROUND OF THE INVENTION

The increased density and reduced cost of integrated circuit components has made many previously impractical products commercially viable. One type of product made viable by advances in integrated circuit technology is the digital cordless telephone. A digital cordless telephone handset receives an analog speech signal via a microphone, converts the analog speech signal into a digital speech signal, compresses the digital speech signal, modulates the compressed signal at a radio frequency (RF), and transmits the modulated RF signal through an antenna. The transmitted RF signal is received by a nearby base station where it may be converted to an analog signal (or remain in digital form for digital switching equipment), and ultimately relayed to the destination telephone. When a similar signal is received from the destination telephone, the telephone signal undergoes the same process in reverse. The base station transmits a digital RF signal to the handset which is received via the antenna, demodulated, decompressed, and converted into an analog speech signal which drives a speaker in the handset.

One standard for the operation of a cordless telephone handset is the U.K. Cordless Telephone, Second Generation (CT-2) standard. A CT-2 handset receives an analog voice signal from a microphone. The voice signal is converted to digital pulse code modulation (PCM) format, processed through an adaptive differential pulse code modulation (ADPCM) encoder, and then modulated and transmitted according to the CT-2 Common Air Interface (CAI) protocol to a base station. CT-2 specifies CCITT G.721 ADPCM for the operation of the ADPCM encoder. Transmit and receive signals are sent and received to and from the base station in packets in a ping-pong fashion. CAI specifies that a part of the packet includes signalling information including such things as call setup and termination requests and handshaking information. For signal reception, a packet is received, demodulated, processed through a G.721 ADPCM decoder, converted from digital PCM to analog, and then provided to a speaker.

Both analog and digital functions are necessary in the operation of a digital cordless telephone handset. To perform the conversion from analog to PCM and from PCM to analog, a conventional integrated circuit such as the Motorola MC145554 μ-law PCM Codec-Filter or the Motorola MC145557 A-law PCM Codec-Filter may be used. To perform the conversion from PCM to ADPCM and from ADPCM to PCM, a conventional integrated circuit such as the Motorola MC145532 ADPCM Transcoder may be used. Both of these functions may also be combined into a single, mixed signal processing integrated circuit.

In the CT-2 cordless telephone system, the handset establishes a digital link with the base station. The link is normally maintained until the call is completed. In some cases, the link may be lost or broken between the handset and the base station during the call. For example, if the user moves the handset outside of the range of the base station, then the link may be lost. The result is that a high level of white noise is provided to the speaker due to the randomness of the received data until the broken link is detected and the noise is muted. A noise level of about 3 to 6 decibels (dB) below the maximum level may occur. The only method specified by the CAI protocol to detect link loss is to detect the absence of an expected handshake message in the signalling part of the packet. Intervals in the transmission of handshake messages may be as long as several seconds. One way to lessen the detection time is to force periodic communication between the base station and the handset, which results in a reduction in detection time to several hundred milliseconds. Even then, a user may hear a loud noise when the link is broken.

SUMMARY OF THE INVENTION

Accordingly, there is provided, in one form, a method for noise burst detection in a signal processor comprising the steps of sampling an input signal at an input of the signal processor to provide a sampled input signal; providing a sampled receive signal in linear format in response to the sampled input signal; summing an absolute value of the sampled receive signal a predetermined number of times to provide a total energy estimate; and providing a noise indication if the total energy estimate exceeds a predetermined threshold.

In another form, there is provided a signal processor with noise burst detection comprising input means, noise detection means, and output means. The input means provides a linear reconstructed signal $s_r(k)$ in response to an input signal $I(k)$ of the signal processor. The noise detection means is coupled to the input means, receives signal $s_r(k)$, a input number, and a product of a noise threshold and a plurality. The noise detection means calculates a total energy estimate of signal $s_r(k)$ sampled once for each of the predetermined number of received samples corresponding to the input number. The noise detection means also provides a noise indication in response to the total energy estimate exceeding the product of the noise threshold and the input number. The output means is coupled to the input means, and provides an output signal $s_d(k)$ of the signal processor (28) in response to signal $s_r(k)$. The input means and the output means substantially form a CCITT Recommendation G.726 ADPCM decoder for at least one data rate thereof.

These and other features and advantages will be more clearly understood from the following detailed description taken in conjunction with the accompanying drawings.

DETAILED DESCRIPTION OF THE INVENTION

Figure 1:
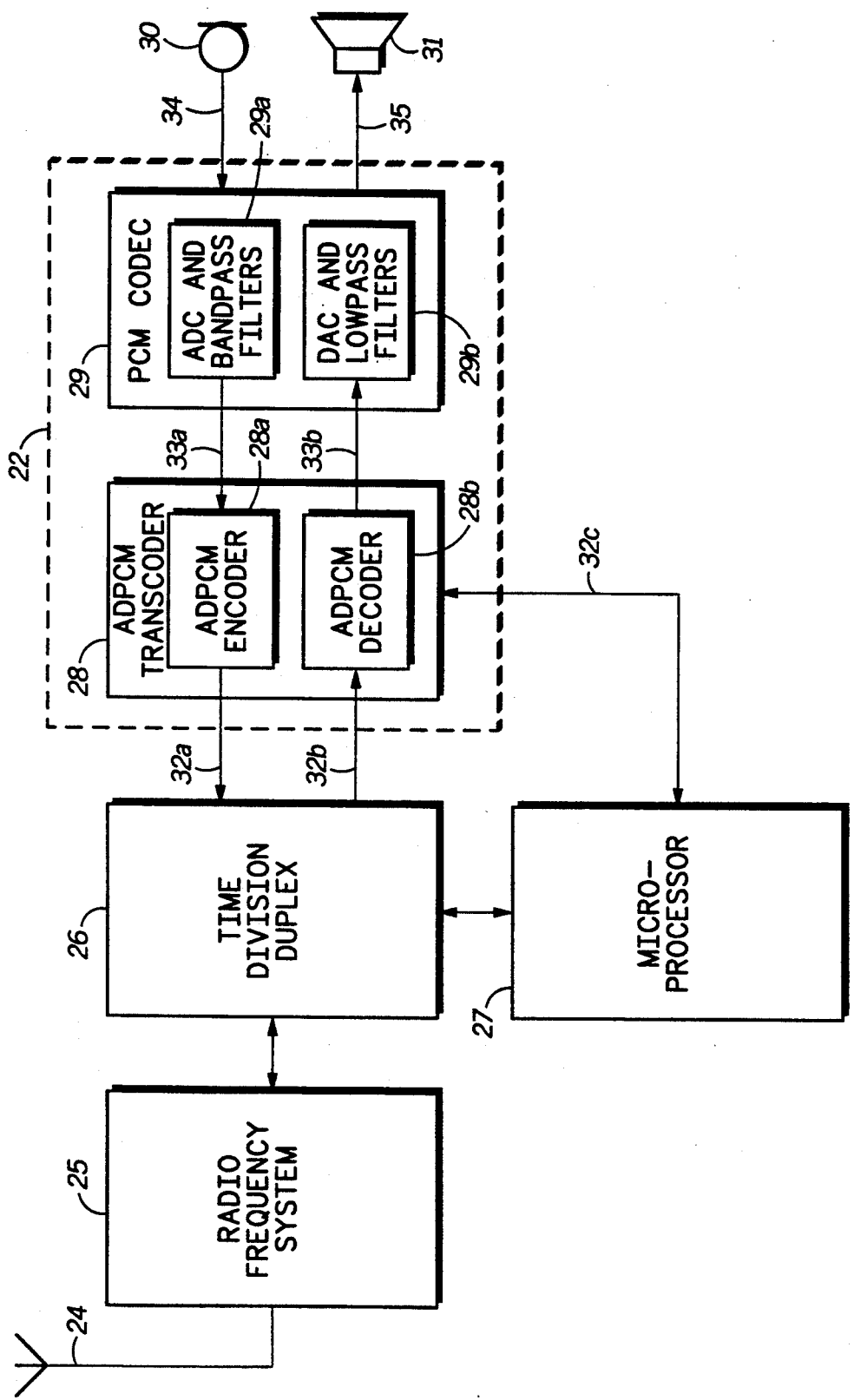
FIG. 1 illustrates in block diagram form a telephone handset including an ADPCM CODEC.

FIG. 1 illustrates in block diagram form a CT-2 telephone handset 20 including an ADPCM CODEC 22. Handset 20 conforms to the CT-2 standard. According to the CT-2 protocol, telephone signals are received and transmitted digitally in packets in a half-duplex or ping-pong scheme between handset 20 and a base station (not shown in FIG. 1). An antenna 24 is used for transmitting and receiving radio-frequency (RF) representations of telephonic signals. An RF system 25 is connected to antenna 24 for receiving and demodulating, and modulating and transmitting, digital streams of telephonic data. As used here, the term "signal" refers to a time-varying electrical signal, and the term "digital signal" refers to a series of digital samples of the signal. A "packet" includes a portion of the digital signal, or alternatively, a specified number of digital samples of the telephone signal, along with digital signalling bits.

A microphone 30 provides an analog telephone signal via input signal lines 34 to ADPCM CODEC 22. In the illustrated embodiment, ADPCM CODEC 22 is a single integrated circuit incorporating both an ADPCM transcoder 28 and a PCM codec 29. PCM codec 29 performs the function of a conventional integrated circuit, such as the Motorola MC145554 μ-law PCM Codec-Filter or the Motorola MC145557 A-law PCM Codec-Filter. Functionally, PCM codec 29 includes two portions, an analog-to-digital converter (ADC) and bandpass filters 29a, and a digital-to-analog converter (DAC) and lowpass filters 29b. ADC and bandpass filters 29a converts the analog telephone signal to a digital telephone signal and converts it to PCM according to the A-law or μ-law algorithm, and provides the digital telephone signal to ADPCM transcoder 28 via input signals 33a. Functionally, ADPCM transcoder 28 includes two portions, an ADPCM encoder 28a, and an ADPCM decoder 28b. ADPCM encoder 28a in turn compresses the 64 kbps digital telephone signal to a 32 kbps ADPCM signal according to the G.721 standard and provides the ADPCM signal to time division duplex block 26 via a signal line 32a. Time division duplex block 26 then combines signalling bits from microprocessor 27 with the compressed digital data from ADPCM transcoder 28 to form a CT-2 packet. Time division duplex block 26 provides the CT-2 packet to radio frequency system 25, which modulates it and provides it as an RF signal to antenna 24, where it is radiated and eventually received by the base station. The modulation scheme is a two-level FSK shaped by an approximately Gaussian filter, as described in the CT-2 CAI Specification.

For reception, a packet from the base station is received as a modulated RF signal on antenna 24. Radio frequency system 25 receives the RF signal and demodulates it. The packet is then presented to a time division duplex block 26. Time division duplex block 26 splits the packet into its two constituent components, making signalling bits available to microprocessor 27. Time division duplex block 26 makes the compressed digital signal available to an ADPCM transcoder 28 via signals 32b. Subsequently, microprocessor 27 reads the signalling bits and performs associated signalling functions, such as call setup and disconnect.

ADPCM decoder 28b decompresses the compressed digital signal received from time division duplex block 26. In the illustrated embodiment, as part of a CT-2 handset, ADPCM decoder 28b conforms to CCITT Recommendation G.721. ADPCM decoder 28b converts the 32 kbps ADPCM digital signal to 64 kbps PCM according to standard G.721 ADPCM. ADPCM transcoder 28 is connected via input and output signals 32c to microprocessor 27, which initializes and controls the operation thereof. DAC and lowpass filters 29b receives the PCM data via input signals 33b, performs A-law or μ-law decompression and digital-to-analog conversion to form an analog telephone signal, and provides the analog telephone signal to a speaker 31 and a ringer (not shown in FIG. 1) via output signals 35.

One possibility for detecting a broken link is to compare the average energy level of the received signal to a threshold. If the average energy level over a predetermined period exceeds the threshold, then it is possible to conclude that the link has been broken and to mute the output to speaker 31. A method and apparatus to detect a broken link in this manner is disclosed in U.S. patent application Ser. No. 07/882,033, filed concurrently herewith, entitled "Broken Link Detect Using Audio Energy Level" by Gary S. Lobel and assigned to the assignee hereof, which is herein incorporated by reference.

To calculate average power with this method, microprocessor 27 must sample the received digital PCM data conducted on signal 33b. For some systems, however, this calculation is impractical. First, PCM is a logarithmic format; to calculate power, the data must be converted to a linear format. Second, in implementations in which ADPCM transcoder 28 and PCM codec 29 are included in a single integrated circuit (such as mixed signal processing system 22), signal 33b is not available externally without dedicating additional device pins (for data, clock, and enable signals). Third, some applications, such as the CT-2 handset itself, are extremely cost-sensitive; to minimize cost, microprocessor 27 may have reduced performance and may not have enough computational power to perform the power calculation.

Figure 2:
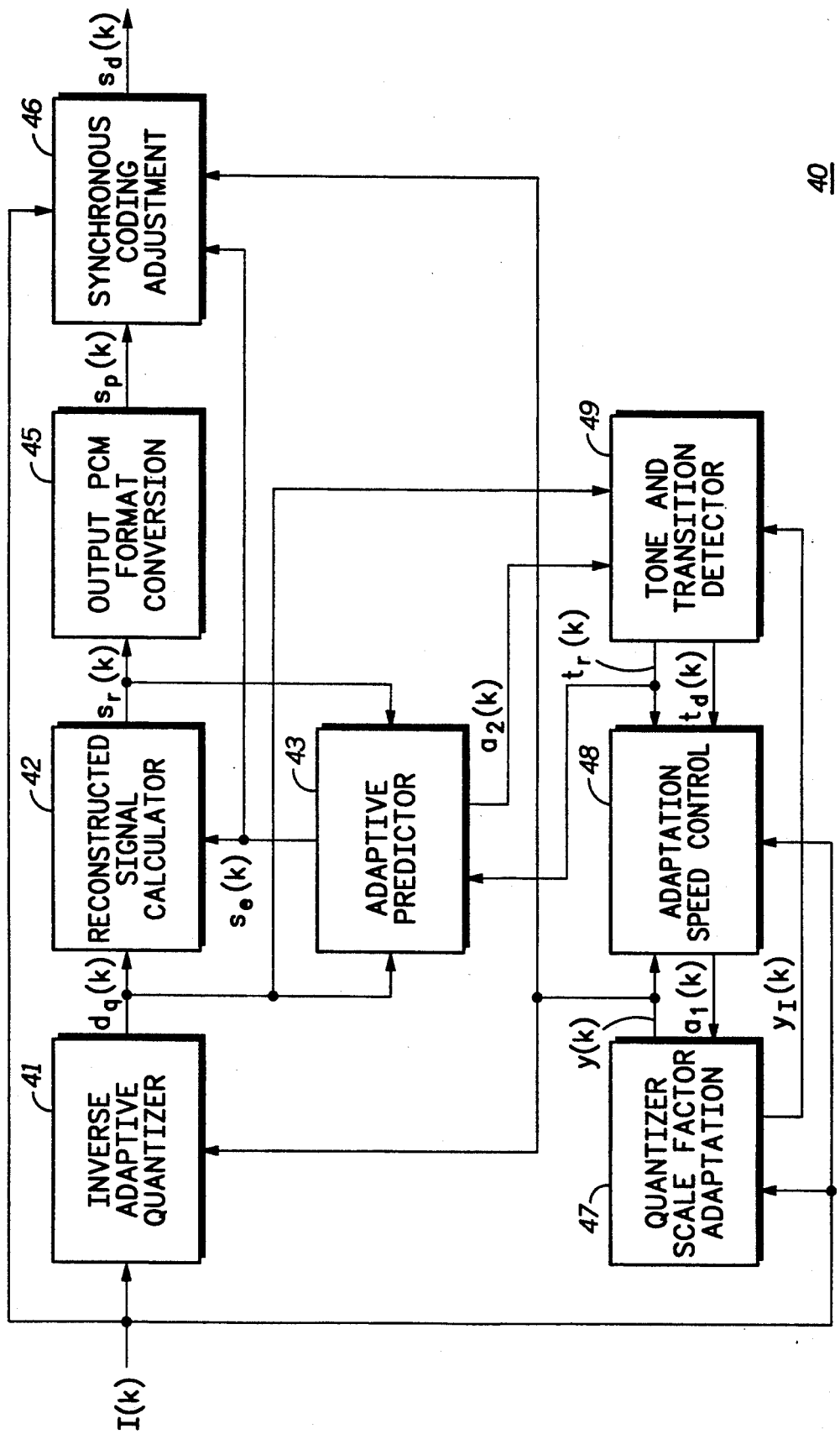
FIG. 2 illustrates in block form a functional block diagram of a prior art ADPCM decoder conforming to CCITT Recommendation G.721 or G.726.

FIG. 2 illustrates in block form a functional block diagram of a prior art ADPCM decoder 40 conforming to CCITT Recommendation G.721 or G.726. ADPCM decoder 40 includes an inverse adaptive quantizer 41, a reconstructed signal calculator 42, an adaptive predictor 43, an output PCM format conversion 45, a synchronous coding adjustment 46, a quantizer scale factor adaptation 47, an adaptation speed control 48, and a tone and transition detector 49. The operation of each of these functional blocks is well-known and is described in CCITT Recommendation G.726-1990.

Figure 3:
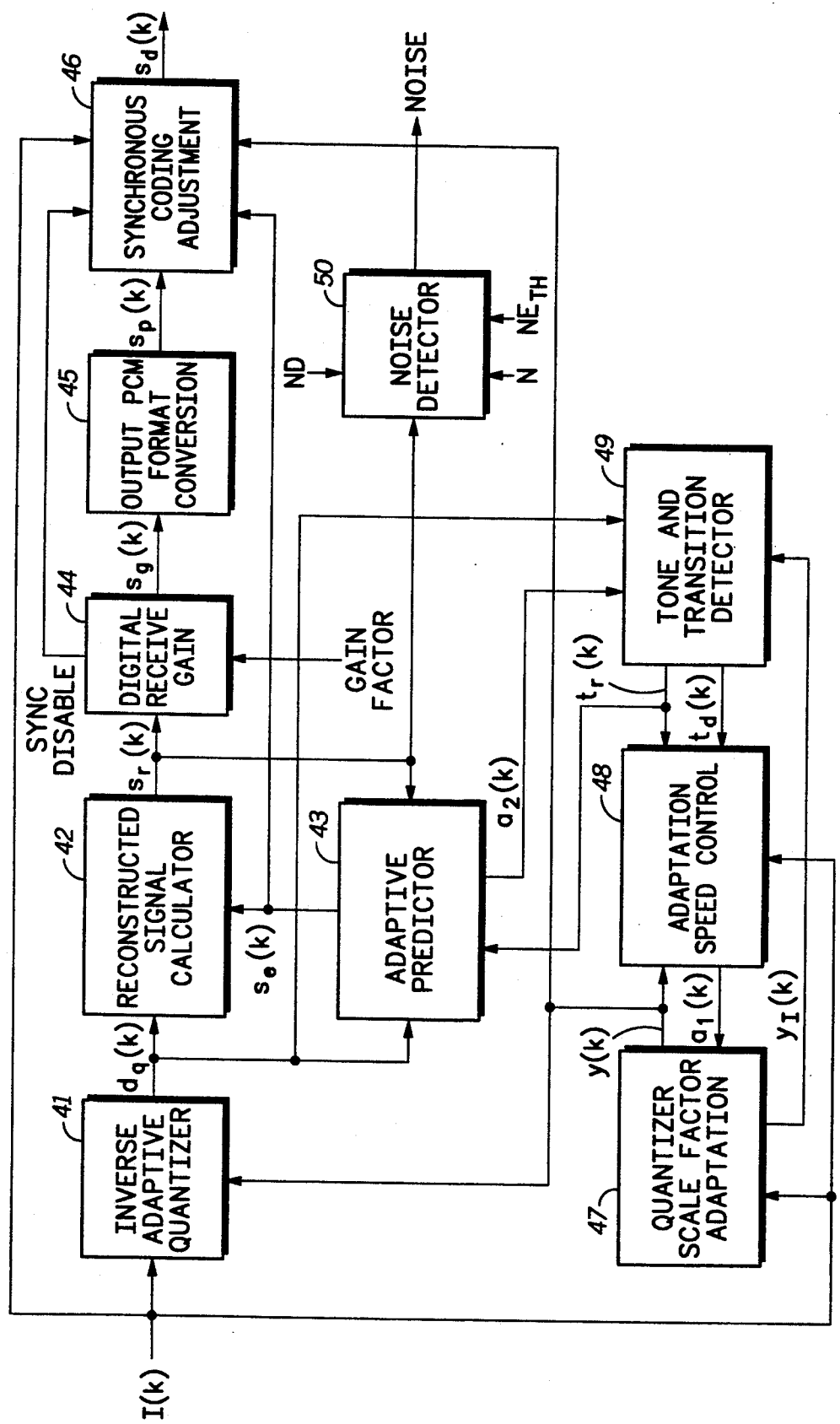
FIG. 3 illustrates in block form a functional block diagram of the ADPCM decoder of FIG. 1 in accordance with the present invention.

FIG. 3 illustrates in block form a functional block diagram of ADPCM decoder 28b of FIG. 1 in accordance with the present invention. ADPCM decoder 28b includes a digital receive gain 44 and a noise detector 50. While preferred for ADPCM decoder 28b, other embodiments of the present invention may omit digital receive gain 44. All other blocks besides perform similarly to corresponding blocks of the ADPCM decoder specified in G.721 or G.726 and shown in FIG. 2. Digital receive gain 44 receives the reconstructed signal $s_r(k)$ and a variable GAIN FACTOR. In response, digital receive gain 44 provides a reconstructed signal with gain labelled "$s_g(k)$", and a signal labelled SYNC DISABLE to synchronous coding adjustment 46. Thus, digital receive gain 44 allows a linear gain adjustment. The operation of digital receive gain 44 is described in U.S. Pat. No. 5,259,001, entitled "ADPCM Decoder with an Integral Digital Receive Gain and Method Therefor", filed Dec. 17, 1991, issued Nov. 2, 1993 by Jose Corleto, Luis Bonet, and David Yatim, and assigned to the assignee hereof, which is herein incorporated by reference.

Noise detector 50 receives the reconstructed signal $s_r(k)$ and three parameters: a number of samples which will be included in the energy computation labelled "N", an energy threshold value labelled "$NE_{TH}$", and a noise detection enable labelled "ND". Microprocessor 27 provides parameters N, $NE_{TH}$, and ND to ADPCM transcoder 28 via a conventional serial communications port (SCP) of ADPCM transcoder 28 (not shown in FIG. 3). Noise detector 50 provides a noise indication labelled "NOISE" in response to the average energy of $s_r(k)$, labelled "$E_{AVE}$", exceeding a predetermined threshold, labelled "$E_{TH}$". One way of performing this energy calculation is to approximate $E_{AVE}$ by adding the absolute value of signal $s_r(k)$ over N sample periods, and then divide the result by N, which is expressed as:

$$E_{AVE}=(1/N)(\Sigma |s_r(k)|) \quad [1]$$

where "$\Sigma$" represents the summation operator, and where the summing interval is from (k=0) to (k=N-1). However, this calculation is cumbersome for some DSPs. An application-specific DSP includes a reduced number of instructions to optimize the operation for real-time signal processing applications. A divide instruction is not required for G.721 ADPCM. Thus, in order to minimize the number of instructions, it is desirable to eliminate the need for a divide instruction in the average power calculation.

Average power calculation without a divide instruction can be done if the total energy, instead of the average energy, is computed. Noise detector 50 solves this problem by activating NOISE if the energy over N samples, labelled "$NE_{AVE}$", exceeds $NE_{TH}$. This formula is expressed mathematically as:

$$IF[(NE_{AVE}=\Sigma |s_r(k)|) \geq NE_{TH}] \text{ THEN}$$
$$(NOISE=1) \text{ ELSE } (NOISE=0) \quad [2]$$

where, as before, the summing interval is from (k=0) to (k=N-1). Since the number of samples N and an average energy threshold may be determined in advance, their product $NE_{TH}$ is known. Microprocessor 27 of FIG. 1 provides $NE_{TH}$ to noise detector 50, which performs the average energy estimation of equation 2 and provides NOISE accordingly. In response to the activation of NOISE, microprocessor 27 attenuates or mutes the received signal. The muting may occur in ADPCM decoder 28, PCM codec 29, or directly to signal 35 provided to speaker 31. In the preferred embodiment, digital receive gain 44 allows microprocessor 27 to mute the received signal digitally by setting GAIN FACTOR to zero.

Figure 4:
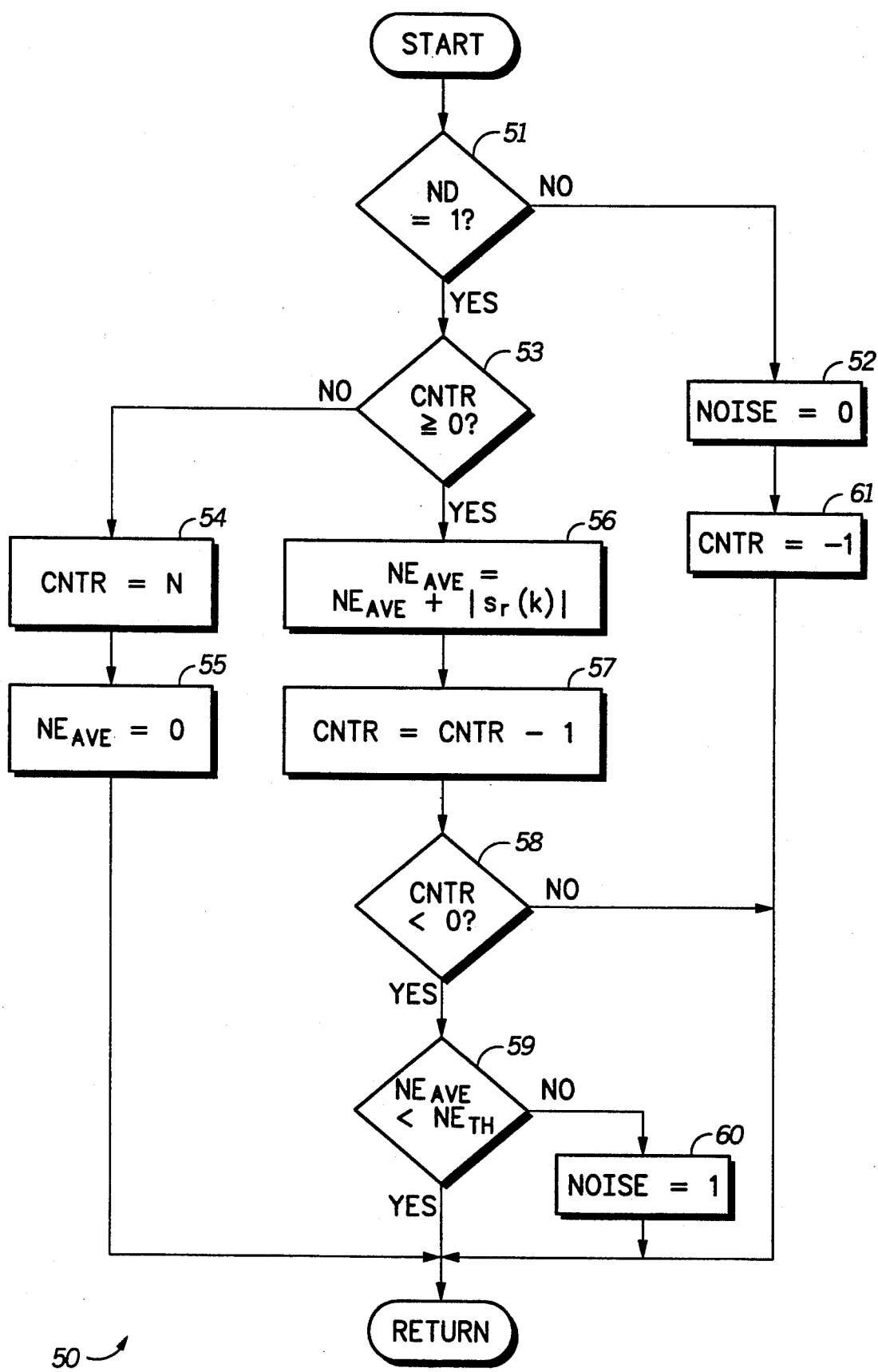
FIG. 4 illustrates a flow chart in accordance with and illustrating the method of the present invention.

FIG. 4 illustrates a flow chart in accordance with and illustrating the method of the present invention. The flow chart of FIG. 4 implements noise detector 50 of FIG. 3, and is assigned the same reference number. ADPCM decoder 28b starts execution of the noise detection routine by checking, at step 51, whether a noise detection control bit, labelled "ND", is set. If ND is not set, then noise detector 50 is disabled and program flow is returned to a main routine after NOISE is cleared at step 52 and CNTR is set to negative 1 at step 61. If ND is set, then a counter variable labelled "CNTR" is checked at step 53. CNTR is an internal variable that keeps track of how many values of $|s_r(k)|$ remain to be accumulated. CNTR is set to negative 1 upon power-up and reset of ADPCM codec 22. If ND=1 (enabled), and CNTR is negative, then CNTR is initialized to N, the number of samples of $|s_r(k)|$ that will be used in the energy calculation, at step 54. Internal variable $NE_{AVE}$, which represents the total energy estimate over N samples, is initialized to zero at step 55.

On the following sample, a positive value of CNTR is detected at step 53. $|s_r(k)|$ is added to the value of $NE_{AVE}$ at step 56, and CNTR is decremented at step 57. CNTR is again tested at step 58 to determine if it is negative. Steps 56, 57, and 58 are repeated for each sample until CNTR is decremented to -1. When CNTR is decremented to -1, $NE_{AVE}$ represents an estimate of the total energy for the time interval defined by the sample interval times N. For G.721 32 kbps ADPCM, the sample interval is 125 microseconds ($\mu$sec), and thus $NE_{AVE}$ represents an estimate of the total energy in the signal over an (N)*(125 $\mu$sec) interval. $NE_{AVE}$ is compared to $NE_{TH}$ at step 59. If $NE_{AVE}$ is not less than $NE_{TH}$, then NOISE is set at step 60.

Different ways of implementing the algorithm are also possible. The flow chart of FIG. 4 illustrates a decrementing sample counter. It is also possible to initialize an incrementing sample counter to zero and then to compare the value of $NE_{AVE}$ to $NE_{TH}$ when the counter reaches N. Also, NOISE was set in response to a false result of a test whether $NE_{AVE}$ is less than $NE_{TH}$ at step 59. In another embodiment, NOISE could be set in response to a true result of a test of whether $NE_{AVE}$ is greater than $NE_{TH}$.

Figure 5:
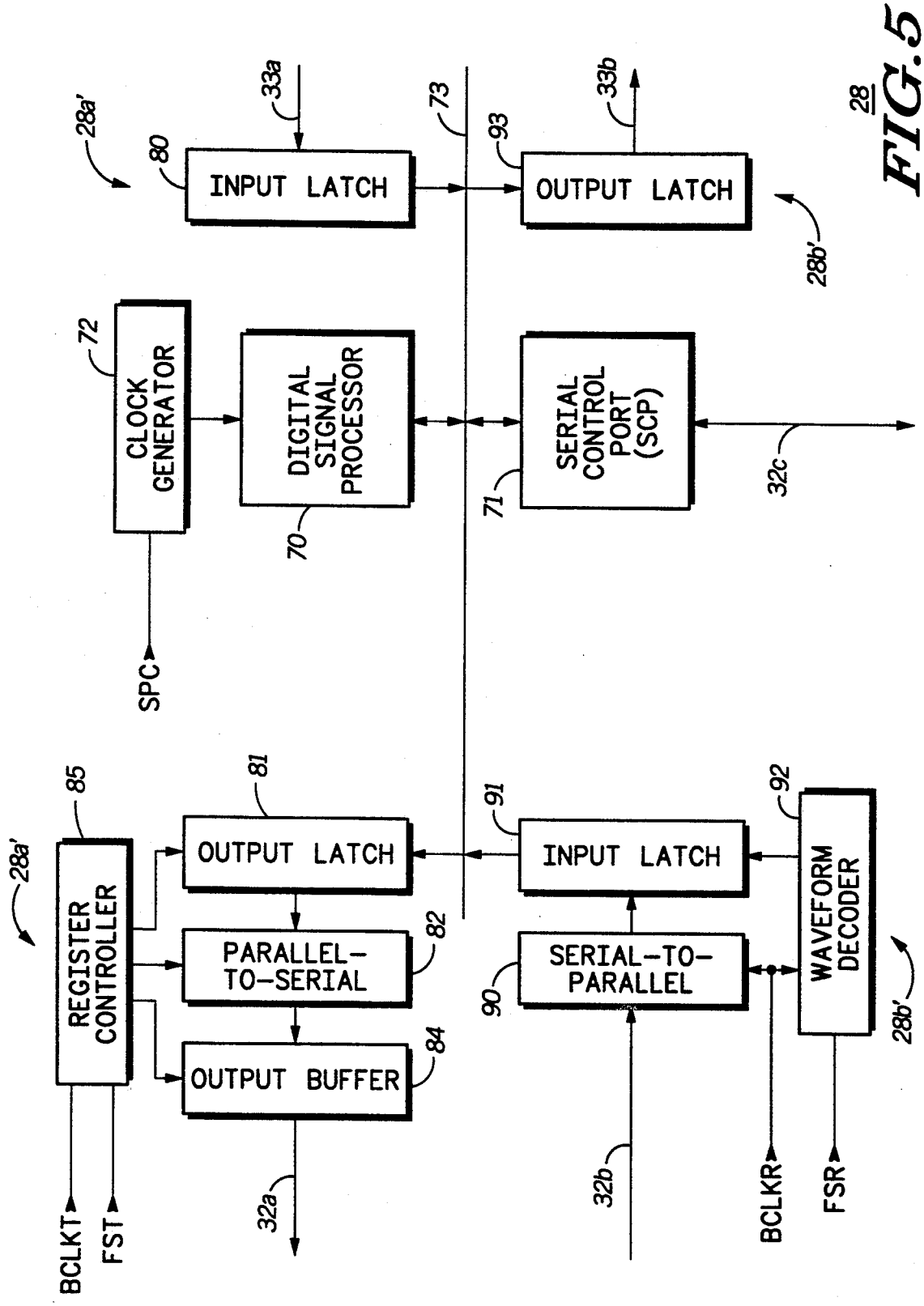
FIG. 5 illustrates in block form the ADPCM transcoder of FIG. 1 in accordance with a preferred embodiment of the present invention.

FIG. 5 illustrates in block form ADPCM transcoder 28 of FIG. 1 in accordance with a preferred embodiment of the present invention. It should be noted that FIG. 5 depicts ADPCM transcoder 28 according to functional blocks representative of hardware circuitry. By contrast, FIG. 3 illustrates a functional block diagram of ADPCM decoder 28b. FIG. 5 clarifies how the blocks of ADPCM transcoder 28 perform the functions illustrated by FIG. 3. In FIG. 5, blocks which correspond to the encoder function are referred to as 28a', and blocks which correspond to the decoder function are labelled 28b', with the remaining blocks performing parts of both functions.

ADPCM transcoder 28 includes a digital signal processor (DSP) 70. DSP 70 is coupled to a communications bus 73 for receiving data therefrom and providing data thereto. A clock generator 72 receives a signal labelled "SPC" which is the output of a crystal oscillator (not shown). Clock generator 72 is coupled to DSP 70 and provides a clock signal thereto. A serial control port (SCP) 71 is also connected to communications bus 73. SCP 71 is connected to microprocessor 27 of FIG. 1 via signal lines 32c. SCP 71 allows microprocessor 27 to initialize and control the operation of ADPCM transcoder 28. SCP 71 includes registers which store ND, N, NE$_{TH}$, and GAIN FACTOR from microprocessor 27, and NOISE from ADPCM decoder 28b.

ADPCM encoder 28a' includes an input latch 80, an output latch 81, a parallel-to-serial block 82, an output buffer 84, and a register controller 85. Input latch 80 is connected to PCM codec 29 of FIG. 1 via input signal lines 33a. Input latch 80 latches digital PCM data words from PCM codec 29 and provides the data to DSP 70 via communications bus 73. DSP 70 performs the function of a G.721 ADPCM encoder through microcode. DSP 70 also provides ADPCM data words via communications bus 73 to output latch 81. The ADPCM data word may be either 8, 4, 3, or 2 bits corresponding to a data rate of either 64, 32, 24, or 16 kbps, respectively. In the CT-2 handset, however, a data word of 4 bits corresponding to the G.721 32 kbps data rate is used. Parallel-to-serial block 82 is connected to output latch 81 and provides an ADPCM data word serially to output buffer 84, which provides the data to time division duplex block 26 via signal line 32a. Register controller 85 is connected to, and controls the operation of, output latch 81, parallel-to-serial block 82, and output buffer 84 in response to a clock input signal labelled "BCLKT" and a control signal labelled "FST".

ADPCM decoder 28b includes a serial-to-parallel block 90, an input latch 91, a waveform decoder 92, and an output latch 93. Serial-to-parallel block 90 receives an ADPCM-encoded stream of data bits via input signal line 32b, combines the data into ADPCM data words, and provides the data words to input latch 91. Input latch 91 stores an ADPCM data word and makes it available to DSP 70. Waveform decoder 92 receives input signals labelled "FSR" and "BCLKR". Signal BCLKR clocks the received data, and signal FSR determines the operating mode. Together, signals BCLKR and FSR determine operation at a data rate of either 64, 32, 24, or 16 kbps. In the CT-2 handset, however, a data word of 4 bits corresponding to the G.721 32 kbps data rate is used. DSP 70 performs the function of a G.721 ADPCM decoder having the digital receive gain and noise detection functions illustrated in FIG. 3 in microcode. DSP 70 provides digital PCM signal s$_d$(k) to output latch 93, which subsequently provides it to PCM codec 29 via signal line 33b.

ADPCM transcoder 28 performs the functions of a G.721 ADPCM encoder and a G.721 ADPCM decoder. In FIG. 5, several blocks of integrated circuit hardware assist DSP 70 in performing each function. Microcode running on DSP 70 actually performs the functional block diagram of FIG. 3, and thus DSP 70 is common to both the ADPCM encoder and decoder functions. In an alternate embodiment, some or all of the functional blocks of FIG. 3 may be performed by hardware circuitry. However, because of the efficiency with which DSP 70 implements noise detector 50 and digital receive gain 44, by using spare clock cycles that are not needed to perform the other encoder and decoder functions, microcode implementation is preferred. For the same reasons, muting the received audio signal by providing (GAIN FACTOR=0) to digital receive gain 44 after noise detector 50 activates NOISE is also preferred.

While the invention has been described in the context of a preferred embodiment, it will be apparent to those skilled in the art that the present invention may be modified in numerous ways and may assume many embodiments other than that specifically set out and described above. For example, while operation in the context of an G.726 ADPCM decoder was illustrated, the method of the present invention may be used in any signal processing system in which a linear received signal is available. While functional blocks implemented with microcode were illustrated, it is also possible to perform the ADPCM decoder function with hardware circuitry. Any data processor, rather than a DSP, may also be used to perform the function of any portion of ADPCM decoder 28b. While digital receive gain 44 provides a convenient method of muting the received signal after detection of a noise burst or broken link, other methods of attenuating the received signal are possible. Accordingly, it is intended by the appended claims to cover all modifications of the invention which fall within the true spirit and scope of the invention.

We claim:

1. A method for noise burst detection in a signal processor comprising the steps of:
   sampling an input signal at an input of the signal processor to provide a sampled input signal;
   providing a sampled receive signal in linear format in response to said sampled input signal;
   summing an absolute value of said sampled receive signal a predetermined number of times to provide a total energy estimate; and
   providing a noise indication if said total energy estimate exceeds a predetermined threshold.

2. The method of claim 1 further comprising the step of performing said steps of providing said sampled receive signal, summing, and providing said noise indication with a digital signal processor.

3. The method of claim 1 further comprising the step of providing said noise indication if said total energy estimate exceeds a product of said predetermined number and an energy threshold.

4. A method for noise burst detection in a signal processor comprising the steps of:
   sampling an input signal at an input of the signal processor to provide a sampled input signal;
   providing a sampled receive signal in linear format in response to said sampled input signal;
   initializing a counter to a predetermined value;
   initializing a variable representing a total energy estimate of said sampled receive signal to zero;
   adding an absolute value of said sampled receive signal to said variable to provide a new value of said variable;
   decrementing said counter;
   repeating said steps of adding and decrementing until said counter is less than zero; and
   providing a noise indication if said variable exceeds a predetermined threshold.

5. The method of claim 4 wherein said step of repeating further comprises the step of repeating said steps of adding, decrementing, and providing said noise indication once for each of a plurality of samples received by the signal processor while said counter is greater than or equal to zero.

6. The method of claim 4 wherein said step of adding further comprises the step of adding an absolute value of a reconstructed signal s$_r$(k) of an adaptive differential pulse code modulation (ADPCM) decoder complying with CCITT Recommendation G.726 for at least one data rate thereof, to said variable to provide said new value of said variable.

7. The method of claim 4 further comprising the step of performing said steps of initializing said counter, initializing said total energy estimate adding, decrementing, repeating, and providing, in response to a noise detection control signal.

8. A method for noise burst detection in a signal processor comprising the steps of:
sampling an input signal at an input of the signal processor to provide a sampled input signal;
providing a sampled receive signal in linear format in response to said sampled input signal;
setting a counter to a predetermined number and a variable representing a total energy estimate of said sampled receive signal to zero in response to said counter being less than zero;
adding an absolute value of said sampled receive signal to said variable to provide a new value for said variable;
decrementing said counter;
providing a noise indication if said variable exceeds a product of a predetermined threshold and said predetermined number, in response to said counter being less than zero; and
repeating said steps of setting, adding, decrementing, and providing said noise indication while a noise detection control signal is active.

9. The method of claim 8 wherein said step of repeating further comprises the step of repeating said steps of setting, adding, decrementing, and providing said noise for each of a plurality of received samples, said plurality of received samples greater than or equal to said predetermined number.

10. The method of claim 8 further comprising the steps of:
clearing said noise indication and initializing said counter to a negative value in response to a noise detection control signal being cleared; and
performing said steps of setting, adding, decrementing, and providing said noise indication while said noise detection control signal is set.

11. A signal processor with noise burst detection, comprising:
input means for providing a linear reconstructed signal $s_r(k)$ in response to an input signal $I(k)$ of the signal processor;
noise detection means coupled to said input means, for receiving said signal $s_r(k)$, an input number, and a product of a noise threshold and said input number, for calculating a total energy estimate of said signal $s_r(k)$ sampled once for each of a plurality of received samples corresponding to said input number, and for providing a noise indication in response to said total energy estimate exceeding said product of said noise threshold and said input number; and
output means coupled to said input means, for providing an output signal $s_d(k)$ of the signal processor in response to said signal $s_r(k)$;
said input means and said output means substantially forming a CCITT Recommendation G.0.726 adaptive differential pulse code modulation (ADPCM) decoder for at least one data rate thereof.

12. The signal processor of claim 11 wherein said output means further comprises an integral digital receive gain for receiving said signal $s_r(k)$ and a gain factor, for multiplying said signal $s_r(k)$ by said gain factor to provide a reconstructed signal with gain $s_g(k)$, and for substituting said signal $s_g(k)$ for said signal $s_r(k)$ when said gain factor is not equal to unity gain.

13. The signal processor of claim 12 further comprising means for providing said noise indication to a microprocessor and for receiving said gain factor from said microprocessor.

14. The method of claim 1 wherein said step of providing said sampled receive signal comprises the step of decoding said sampled input signal in an adaptive differential pulse code modulation (ADPCM) decoder to provide said sampled receive signal.

15. The method of claim 4 wherein said step of providing said sampled receive signal comprises the step of decoding said sampled input signal in an adaptive differential pulse code modulation (ADPCM) decoder to provide said sampled receive signal.

16. The method of claim 8 wherein said step of providing said sampled receive signal comprises the step of decoding said sampled input signal in an adaptive differential pulse code modulation (ADPCM) decoder to provide said sampled receive signal.

* * * * *

UNITED STATES PATENT AND TRADEMARK OFFICE
CERTIFICATE OF CORRECTION

PATENT NO. : 5,319,573
DATED : June 7, 1994
INVENTOR(S) : Jose G. Corleto, et al.

It is certified that error appears in the above-indentified patent and that said Letters Patent is hereby corrected as shown below:

Column 9, line 34, before "for" insert --indication--.

Signed and Sealed this

Fifteenth Day of November, 1994

Attest:

BRUCE LEHMAN

*Attesting Officer*  *Commissioner of Patents and Trademarks*